United States Patent
Lin et al.

(10) Patent No.: US 11,401,164 B2
(45) Date of Patent: Aug. 2, 2022

(54) PROCESS FOR PRODUCING GRAPHENE FOAM-BASED SEALING MATERIALS

(71) Applicant: Nanotek Instruments, Inc., Dayton, OH (US)

(72) Inventors: Yi-jun Lin, Taoyuan (TW); Aruna Zhamu, Springboro, OH (US); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 425 days.

(21) Appl. No.: 15/994,071

(22) Filed: May 31, 2018

(65) Prior Publication Data
US 2019/0367372 A1 Dec. 5, 2019

(51) Int. Cl.
*C01B 32/184* (2017.01)
*C01B 32/225* (2017.01)
(Continued)

(52) U.S. Cl.
CPC .......... *C01B 32/184* (2017.08); *C01B 32/225* (2017.08); *B82Y 30/00* (2013.01);
(Continued)

(58) Field of Classification Search
CPC . C01B 32/184; C01B 32/225; C01B 2204/02; C01B 2204/04; C01B 2204/24; C01B 2204/32; C01B 2204/22; C01B 32/186; C01B 32/194; C01B 32/198; C01B 32/19; C01B 32/192; C01B 32/182; C01B 2204/00; C01B 2204/06; C01B 2204/065; C01B 2204/20; C01B 2204/26;
(Continued)

(56) References Cited

U.S. PATENT DOCUMENTS 7,071,258 B1 7/2006 Jang et al.
9,966,199 B2 5/2018 Zhamu et al.
(Continued)

FOREIGN PATENT DOCUMENTS

| CN | 102732037 | * | 9/2014 | .............. C08L 83/04 |
| CN | 106987112 A | | 7/2017 | |
| WO | 2016066843 A1 | | 5/2016 | |

OTHER PUBLICATIONS

Machine translation of CN 102732037 to "China." (Year: 2014).*
(Continued)

*Primary Examiner* — Daniel C. McCracken

(57) ABSTRACT

Provided is a process for producing a solid graphene foam-based sealing material. The process comprises: (a) preparing a graphene dispersion having a graphene material dispersed in a liquid medium, which contains an optional blowing agent; (b) dispensing and depositing the graphene dispersion into desired shapes and partially or completely removing the liquid medium from these shapes to form dried graphene shapes; (c) heat treating the dried graphene shapes at a first heat treatment temperature from 50° C. to 3,200° C. at a desired heating rate sufficient to induce volatile gas molecules from the non-carbon elements or to activate the blowing agent for producing the graphene foam; and (d) coating or impregnating the graphene foam with a permeation-resistant binder or matrix material to form the sealing material.

16 Claims, 12 Drawing Sheets

(51) Int. Cl.
*B82Y 30/00* (2011.01)
*F16J 15/3284* (2016.01)
*B82Y 40/00* (2011.01)

(52) U.S. Cl.
CPC ............ *B82Y 40/00* (2013.01); *C01B 2204/02* (2013.01); *C01B 2204/04* (2013.01); *C01B 2204/22* (2013.01); *C01B 2204/24* (2013.01); *C01B 2204/32* (2013.01); *F16J 15/3284* (2013.01)

(58) Field of Classification Search
CPC . C01B 2204/28; C01B 2204/30; C01B 32/20; C01B 32/205; C01B 32/21; C01B 32/215; C01B 32/22; C01B 32/23; B82Y 30/00; B82Y 40/00; F16J 15/3284
See application file for complete search history.

(56) References Cited

U.S. PATENT DOCUMENTS

| | | |
|---|---|---|
| 10,183,754 B1 | 1/2019 | Agarwal et al. |
| 2005/0271574 A1 | 12/2005 | Jang et al. |
| 2008/0048152 A1 | 2/2008 | Jang et al. |
| 2013/0162216 A1* | 6/2013 | Zhamu .................. H01G 11/06 320/130 |
| 2014/0030590 A1 | 1/2014 | Wang et al. |
| 2016/0019995 A1* | 1/2016 | Zhamu .................. H01B 13/30 428/219 |
| 2016/0079001 A1* | 3/2016 | Lin ..................... C04B 35/4682 361/305 |
| 2017/0237075 A1* | 8/2017 | Pedros ................. H01M 4/583 429/241 |

OTHER PUBLICATIONS

Maturos et al., "Fabrication of Stretchable 3D Graphene Foam/Poly-Dimethylsiloxane Composites for Strain Sensing" Proceedings of the 15th IEEE International Conference on Nanotechnology (2015) pp. 1231-1234.

U.S. Appl. No. 15/994,061 Final Office Action dated May 6, 2020, 23 pages.

U.S. Appl. No. 15/994,061 Nonfinal Office Action dated Dec. 11, 2019, 18 pages.

PCT/US19/34510 International Search Report and Written Opinion dated Sep. 11, 2019, 9 pages.

Chen et al., "Three-dimensional Flexible and Conductive Interconnected Graphene Networks Grown by Chemical Vapor Deposition" Nature Materials (2011) vol. 10, pp. 424-428.

Choi et al., "3D Macroporous Graphene Frameworks for Supercapacitors with High Energy and Power Densities" ACS Nano (2012) vol. 6, pp. 4020-4028.

Fedorov et al., "Highly Exfoliated Graphite Fluoride as a Precursor for Graphene Fluoride Dispersions and Films" Croatica Chemica Acta (2012) vol. 85, No. 1, pp. 107-112.

Karlicky et al., "Halogenated Graphenes: Rapidly Growing Family of Graphene Derivatives" ACS Nano (2013) vol. 7, No. 8, pp. 6434-6464.

Xu et al., "Self-Assembled Graphene Hydrogel via a One-Step Hydrothermal Process" ACS Nano (2010) vol. 4, No. 7, pp. 4324-4330.

* cited by examiner

PROCESS FOR PRODUCING GRAPHENE FOAM-BASED SEALING MATERIALS

FIELD OF THE INVENTION

The present invention relates generally to the field of sealing materials and elements (e.g. O-rings) and, more particularly, to a new class of graphene foam-based sealing materials.

BACKGROUND OF THE INVENTION

A sealing material (e.g. an O-ring) must have a high elastic deformation and high yield strength, the two mechanical properties that are often mutually exclusive. For example, a successful O-ring joint design requires a rigid mechanical mounting that applies a large deformation to the O-ring, which introduces a mechanical stress at the O-ring contacting surfaces. Leaking will not occur as long as the pressure of the fluid being contained does not exceed the contact stress of the O-ring. The contact stress rises with increasing pressure and an O-ring can seal high pressure as long as the contact stress does not exceed the yield strength of the O-ring.

The seal is often designed to have a point contact between the O-ring and sealing faces. The O-ring must be able to contain high pressure without exceeding the yield stress of the O-ring body. The flexible (elastic) nature of O-ring materials accommodates imperfections in the mounting parts. Rubbers or elastomers are the most commonly used O-ring materials due to their high elastic deformation and moderate yield strength under compression. However, rubbers and elastomers are typically not mechanically strong and do not withstand high temperatures.

Carbon and graphite materials are relatively stable at high temperatures, but they are not sufficiently elastic. Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nanographene platelets" (NGPs). Graphene or graphene oxide sheets/platelets (collectively, NGPs) are a new class of carbon nanomaterial (a 2-D nanocarbon) that is distinct from the 0-D fullerene, the 1-D CNT, and the 3-D graphite.

Our research group pioneered the development of graphene as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

In one process, graphene materials are obtained by intercalating natural graphite particles with a strong acid and/or an oxidizing agent to obtain a graphite intercalation compound (GIC) or graphite oxide (GO), as illustrated in FIG. 1(A) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range from typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected. A SEM image of graphite worms is presented in FIG. 1(B).

In Route 1A, these graphite worms (exfoliated graphite or "networks of interconnected/non-separated graphite flakes") can be re-compressed to obtain flexible graphite sheets or foils (106) that typically have a thickness in the range from 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nanomaterial by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, (112), as disclosed in our U.S. application Ser. No. 10/858,814. Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process.

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Generally speaking, a foam or foamed material is composed of pores (or cells) and pore walls (a solid material). The pores can be interconnected to form an open-cell foam. A graphene foam is composed of pores and pore walls that contain graphene sheets. The presence of these pores makes the foam not resistant to permeation by gas or liquid species. This would suggest that the graphene foam cannot be a good material for sealing applications. However, contrary to this expectation, after an extensive and in-depth study, the applicants came to discover that graphene foam can be an integral part of a sealing material if graphene foam is judiciously combined with a proper permeation-resistant material.

There are three major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range from 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene foams has major deficiencies. Thus, it is an object of the present invention to provide a cost-effective process for producing highly conductive, elastic, and mechanically robust graphene foams in large quantities. This process does not involve the use of an environmentally unfriendly chemical. This process enables the flexible design and control of the porosity level and pore sizes. The pores are then at least partially filled with a permeation-resistant material.

It is another object of the present invention to provide a process for producing graphene foams that exhibit a high thermal conductivity, high electrical conductivity, high elastic deformation, and/or high compressive strength that are comparable to or greater than those of the graphite/carbon foams and are conducive to combining with a permeation-resistant material to form a sealing material.

SUMMARY OF THE INVENTION

The present invention provides a graphene foam-based sealing material, comprising: (a) a graphene foam framework or skeleton comprising pores and pore walls, wherein the pore walls form a 3D network of interconnected graphene planes or graphene sheets; and (b) a permeation-resistant binder material that coats and embraces the exterior surfaces of the graphene foam framework and/or infiltrates into pores of the graphene foam, occupying preferably from 10% to 100% (preferably from 10% to 98%) of the pore volume. Such a hybrid material exhibits an unprecedented combination of high elastic deformation, high yield strength, high permeation resistance, high-temperature durability, and good thermal conductivity (for fast heat dissipation).

Preferably, the permeation-resistant binder or matrix material occupies from 10% to 98% of the pore volume of the graphene foam framework and a core portion of 2% to 90% of the graphene foam is free from the binder or matrix material.

In certain embodiments, the invention provides a graphene foam-based sealing material comprising: (a) a graphene foam framework comprising pores and pore walls, wherein the pore walls comprise graphene sheets; and (b) a permeation-resistant binder or matrix material that coats and embraces the exterior surfaces of the graphene foam framework and/or infiltrates into pores of the graphene foam, occupying from 10% to 98% of the pore volume of the graphene foam framework.

The present invention provides a process for producing a graphene-based sealing material from graphene sheets, the process comprising:

(a) preparing a graphene dispersion having multiple sheets of a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof, having a non-carbon element content (e.g. O, H, N, B, F, Cl, Br, I, etc.) of substantially 0% to 50% by weight, and wherein the dispersion contains an optional blowing agent having a blowing agent-to-graphene material weight ratio from 0/1.0 to 1.0/1.0;

(b) dispensing and depositing the graphene dispersion to form one or a plurality of elongated shapes (filaments, rods, bands, O-rings, etc.) and partially or completely removing the liquid medium from the shapes to form one or a plurality of dried elongated graphene shapes;

(c) heat treating the one or a plurality of dried elongated graphene shapes at a first heat treatment temperature from 50° C. to 3,200° C. at a desired heating rate sufficient to induce volatile gas molecules from said non-carbon elements or to activate said blowing agent for producing one or a plurality of solid graphene foam shapes having pores, pore walls, and a density from 0.01 to 1.7 g/cm$^3$ or a specific surface area from 50 to 2,600 m$^2$/g; and (d) coating or impregnating the one or a plurality of solid graphene foam shapes with a binder or matrix material to form one or a plurality of sealing material structures. This coating or impregnating procedure may be conducted by using any known process of spraying, dipping, casting, molding, coating, etc. For instance, one may simply dip the graphene foam shape in and out of a metal melt (followed by cooling), polymer-solvent solution (followed by drying), or liquid monomer (followed by polymerizing and/or curing), etc. Alternatively, one may spray these melt, solution, or liquid onto a graphene foam structure, followed by roll-pressing and cooling, drying, or polymerizing.

The optional blowing agent is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

The blowing agent can be a physical blowing agent, a chemical blowing agent, a mixture thereof, a dissolution-and-leaching agent, or a mechanically introduced blowing agent. Preferably, the dispersion contains a blowing agent having a blowing agent-to-graphene weight ratio from 0.01/1.0 to 1.0/1.0.

The process may further include a step of heat-treating the solid graphene foam at a second heat treatment temperature higher than the first heat treatment temperature for a length of time sufficient for obtaining a graphene foam wherein the pore walls contain stacked graphene planes having an inter-plane spacing $d_{002}$ from 0.3354 nm to 0.40 nm and a content of non-carbon elements less than 5% by weight (typically from 0.001% to 2%). When the resulting non-carbon element content is from 0.1% to 2.0%, the inter-plane spacing $d_{002}$ is typically from 0.337 nm to 0.40 nm.

The binder or matrix material may be selected from a polymer, metal, glass, ceramic, pitch (e.g. petroleum pitch, coal tar pitch, heavy oil, etc.), carbon (e.g. CVD carbon or amorphous carbon), or a combination thereof. It may be noted that none of these materials (other than rubber or elastomer) have a large enough elastic deformation (e.g. >2%, preferably >5%, further preferably >10%, and more preferably >20%, etc.) that is fully recoverable upon release of the external stress. Although many metals and plastic materials can be deformed to an extent larger than 2%, these larger deformation values beyond 2% are typically plastic deformations (permanent deformation) that are not recoverable. Surprisingly, selected graphene foams (e.g. those prepared according to the processes herein disclosed) are capable of recovering a compressive deformation as high as 50% (up to 80% in several cases).

However, a foamed material is highly permeable to gaseous or liquid species and, hence, by itself cannot be a good sealing material. As such, the foam structure must be coated or infiltrated with a permeation-resistant material, such as a polymer, metal, glass, ceramic, pitch, or carbon, to make a good sealing material (e.g. O-ring). In such a configuration, graphene foam provides the needed high elasticity (high recoverable deformation) and the coating/infiltration material (the binder material) imparts the permeation resistance. Since graphene is highly heat-resistant and if the permeation-resistant coating/infiltration material is a high temperature material, the resulting structure would be a high-temperature sealing material. The metal, glass, ceramic, pitch, carbon, and selected polymers (e.g. polyimide, ladder polymer, etc.) can be thermally stable having a melting point or thermal degradation temperature higher than 300° C. or even higher than 500° C. The present invention now enables these low-elasticity materials to become sealing materials.

In certain embodiments, the binder or matrix material contains a polymer selected from a thermoplastic resin, thermoset resin, rubber, thermoplastic elastomer, semi-interpenetrating network, simultaneous penetrating network, or a combination thereof.

In certain embodiments, the binder or matrix material occupies from 10% to 98% of the pore volume of the solid graphene foam shapes; preferably not all pores in the graphene foam shapes are occupied by the binder or matrix material. Preferably, the binder or matrix material occupies only an outer portion of a solid graphene foam shape, leaving behind a core portion free from the binder or matrix material.

In certain embodiments, the graphene-based sealing material is an O-ring.

If the original graphene material in the dispersion contains a non-carbon element content higher than 5% by weight, the graphene material in the solid graphene foam (after the heat treatment) contains structural defects that are induced during the step (d) of heat treating.

The liquid medium may be water, an alcohol, an organic solvent, or a combination thereof.

In one embodiment, the first heat treatment temperature is from 100° C. to 1,500° C. In another embodiment, the second heat treatment temperature includes at least a temperature selected from (A) 300-1,500° C., (B) 1,500-2,100° C., and/or (C) 2,100-3,200° C. In a specific embodiment, the second heat treatment temperature includes a temperature in the range from 300-1,500° C. for at least 1 hour and then a temperature in the range from 1,500-3,200° C. for at least 1 hour.

There are several surprising results of conducting first and/or second heat treatments to the dried elongated graphene shapes, and different heat treatment temperature ranges enable us to achieve different purposes, such as (a) removal of non-carbon elements from the graphene material (e.g. thermal reduction of fluorinated graphene to obtain graphene or reduced graphene fluoride, RGF) which generate volatile gases to produce pores or cells in a graphene material, (b) activation of the chemical or physical blowing agent to produce pores or cells, (c) chemical merging or linking of graphene sheets to significantly increase the lateral dimension of graphene sheets in the foam walls (solid portion of the foam), (d) healing of defects created during fluorination, oxidation, or nitrogenation of graphene planes in a graphite particle, and (e) re-organization and perfection of graphitic domains or graphite crystals. These different purposes or functions are achieved to different extents within different temperature ranges. The non-carbon elements typically include an element selected from oxygen, fluorine, chlorine, bromine, iodine, nitrogen, hydrogen, or boron. Quite surprisingly, even under low-temperature foaming conditions, heat-treating induces chemical linking, merging, or chemical bonding between graphene sheets, often in an edge-to-edge manner (some in face-to-face manner).

In one embodiment, the sheet of solid graphene foam has a specific surface area from 200 to 2,000 m$^2$/g. In one embodiment, the sheet of solid graphene foam has a density from 0.1 to 1.5 g/cm$^3$. In an embodiment, step (d) of heat treating the layer of graphene material at a first heat treatment temperature is conducted under a compressive stress. In another embodiment, the process comprises a compression step to reduce a thickness, pore size, or porosity level of the sheet of graphene foam. In some applications, the graphene foam has a thickness no greater than 200 μm.

In an embodiment, the graphene dispersion has at least 3% by weight of graphene oxide dispersed in the liquid medium to form a liquid crystal phase. In another embodiment, the graphene dispersion contains a graphene oxide dispersion prepared by immersing a graphitic material in a powder or fibrous form in an oxidizing liquid in a reaction vessel at a reaction temperature for a length of time sufficient to obtain the graphene dispersion wherein the graphitic material is selected from natural graphite, artificial graphite, mesophase carbon, mesophase pitch, mesocarbon microbead, soft carbon, hard carbon, coke, carbon fiber, carbon nanofiber, carbon nanotube, or a combination thereof and wherein the graphene oxide has an oxygen content no less than 5% by weight.

In an embodiment, the first heat treatment temperature contains a temperature in the range from 80° C.-300° C. and, as a result, the graphene foam has an oxygen content or non-carbon element content less than 5%, and the pore walls have an inter-graphene spacing less than 0.40 nm, a thermal conductivity of at least 150 W/mK (more typically at least 200 W/mk) per unit of specific gravity, and/or an electrical conductivity no less than 2,000 S/cm per unit of specific gravity.

In a preferred embodiment, the first and/or second heat treatment temperature contains a temperature in the range from 300° C.-1,500° C. and, as a result, the graphene foam has an oxygen content or non-carbon content less than 1%, and the pore walls have an inter-graphene spacing less than 0.35 nm, a thermal conductivity of at least 250 W/mK per unit of specific gravity, and/or an electrical conductivity no less than 2,500 S/cm per unit of specific gravity.

When the first and/or second heat treatment temperature contains a temperature in the range from 1,500° C.-2,100° C., the graphene foam has an oxygen content or non-carbon content less than 0.01% and pore walls have an inter-graphene spacing less than 0.34 nm, a thermal conductivity of at least 300 W/mK per unit of specific gravity, and/or an electrical conductivity no less than 3,000 S/cm per unit of specific gravity.

When the first and/or second heat treatment temperature contains a temperature greater than 2,100° C., the graphene foam has an oxygen content or non-carbon content no greater than 0.001% and pore walls have an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

If the first and/or second heat treatment temperature contains a temperature no less than 2,500° C., the graphene foam has pore walls containing stacked graphene planes having an inter-graphene spacing less than 0.336 nm, a mosaic spread value no greater than 0.4, and a thermal conductivity greater than 400 W/mK per unit of specific gravity, and/or an electrical conductivity greater than 4,000 S/cm per unit of specific gravity.

In one embodiment, the pore walls contain stacked graphene planes having an inter-graphene spacing less than 0.337 nm and a mosaic spread value less than 1.0. In another embodiment, the solid wall portion of the graphene foam exhibits a degree of graphitization no less than 80% and/or a mosaic spread value less than 0.4. In yet another embodiment, the solid wall portion of the graphene foam exhibits a degree of graphitization no less than 90% and/or a mosaic spread value no greater than 0.4.

Typically, the pore walls contain a 3D network of interconnected graphene planes that are electron-conducting pathways. The cell walls contain graphitic domains or graphite crystals having a lateral dimension ($L_a$, length or width) no less than 20 nm, more typically and preferably no less than 40 nm, still more typically and preferably no less than 100 nm, still more typically and preferably no less than 500 nm, often greater than 1 μm, and sometimes greater than 10 μm. The graphitic domains typically have a thickness from 1 nm to 200 nm, more typically from 1 nm to 100 nm, further more typically from 1 nm to 40 nm, and most typically from 1 nm to 30 nm.

Preferably, the solid graphene foam contains mesoscaled pores having a pore size from 2 nm to 50 nm (preferably 2 nm to 25 nm). It may be noted that it has not been possible to use Ni-catalyzed CVD to produce graphene foams having a pore size range of 2-50 nm. This is due to the notion that it has not been proven possible to prepare Ni foam templates having such a pore size range and not possible for the hydrocarbon gas (precursor molecules) to readily enter Ni foam pores of these sizes. These Ni foam pores must also be interconnected. Additionally, the sacrificial plastic colloidal particle approaches have resulted in macro-pores that are in the size range of microns to millimeters.

In a preferred embodiment, the present invention provides a roll-to-roll process for producing a solid graphene foam composed of multiple pores and pore walls The process comprises: (a) preparing a graphene dispersion having a graphene material dispersed in a liquid medium, wherein the dispersion optionally contains a blowing agent; (b) continuously or intermittently dispensing and depositing the graphene dispersion onto a surface of a supporting substrate to form a wet layer of graphene material, wherein the supporting substrate is a continuous thin film supplied from a feeder roller and collected on a collector roller; (c) partially or completely removing the liquid medium from the wet layer of graphene material to form a dried layer of graphene; and (d) heat treating the dried layer of graphene material at a first heat treatment temperature from 100° C. to 3,000° C. at a desired heating rate sufficient to activate the blowing agent for producing said solid graphene foam having a density from 0.01 to 1.7 g/cm$^3$ or a specific surface area from 50 to 3,000 m$^2$/g. One may optionally cut a roll of solid graphene foam into pieces of graphene foam having desired dimensions. This process is then followed by coating and/or infiltration of the pores of a graphene foam structure with a binder or matrix material that at least seals off the outer or exterior portion of the graphene foam structure.

DESCRIPTION OF THE PREFERRED EMBODIMENTS

Figure 2:
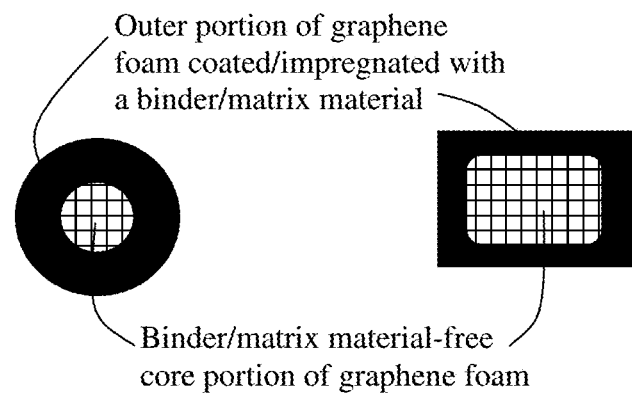
FIG. 2 Schematic of some cross-sectional areas of presently invented O-rings (according to some embodiments); core portion of the graphene foam framework being free from any binder or matrix material and outer portion being fully embraced or "sealed" with a permeation-resistant binder or matrix material.

The present invention provides a graphene foam-based sealing material (e.g. an O-ring), comprising: (a) a graphene foam framework or skeleton comprising pores and pore walls, wherein the pore walls comprise a 3D network of interconnected graphene planes or graphene sheets; and (b) a permeation-resistant binder or matrix material that coats and embraces the exterior surfaces of the graphene foam framework and/or infiltrates into pores of the graphene foam, occupying preferably from 10% to 100% (preferably 10%-98%) of the pore volume. Preferably, as schematically illustrated in FIG. 2, the outer portion of the graphene foam framework is fully infiltrated and completely embraced with a binder or matrix material to impart permeation resistance (against migration of gaseous or liquid species) to the sealing material. However, the interior or core portion (2% to 90%) of the graphene foam framework is preferably free from the binder or matrix material and, thus, the sealing material is preferably somewhat hollow (but the core portion still has graphene, just no binder material). The 3D network of interconnected graphene sheets or planes provides the needed high elasticity, high strength, high thermal conductivity, high yield strength, and improved thermal stability of the sealing material.

In some embodiments, substantially the entire graphene foam framework is filled with the binder or matrix material.

Such a hybrid material exhibits an unprecedented combination of high elastic deformation, high yield strength, high permeation resistance, high-temperature durability, and good thermal conductivity (for fast heat dissipation).

Graphene foam structures may be produced by any known method, such as hydrothermal reduction of graphene oxide gel, metal catalyzed/mediated CVD, and sacrificial material-templated production (e.g. using colloidal polystyrene particles as a template). However, what follows is a description of a preferred process for producing graphene foam structures (frameworks or skeletons) that have significantly better structural integrity, elasticity, thermal conductivity, etc. These graphene foam structures are then coated, impregnated, or infiltrated with a permeation-resistance material.

The binder or matrix material may be selected from a polymer, metal, glass, ceramic, pitch (e.g. petroleum pitch, coal tar pitch, heavy oil, etc.), carbon (e.g. CVD carbon or amorphous carbon), or a combination thereof. It may be noted that, other than rubbers and elastomers, none of these materials were known to be good sealing materials (e.g. O-ring materials). These materials do not have a large enough elastic deformation (e.g. >2%, preferably >5%, further preferably >10%, and more preferably >20%, etc.) that is fully recoverable upon release of the external stress. Ceramic and glass materials are very brittle having very low tensile or compressive strains. Many metals and plastic materials can be deformed to an extent larger than 2%; however, those larger deformation values beyond 2% are typically plastic deformations (permanent deformation) that are not recoverable. Surprisingly, selected graphene foams (e.g. those prepared according to the processes herein disclosed) are capable of recovering a compressive deformation as high as 50% (up to 80% in several cases).

However, a foamed material is highly permeable to gaseous or liquid species and, hence, by itself cannot be a good sealing material. As such, the foam structure must be coated or infiltrated with a permeation-resistant material, such as a polymer, metal, glass, ceramic, pitch, or carbon, to make a good sealing material (e.g. O-ring). In such a configuration, graphene foam provides the needed high elasticity (high recoverable deformation) and the coating/infiltration material (the binder or matrix material) imparts the permeation resistance. Since graphene is highly heat-resistant and if the permeation-resistant coating/infiltration material is a high temperature material, the resulting structure would be a high-temperature sealing material. The metal, glass, ceramic, pitch, carbon, and selected polymers (e.g. polyimide, ladder polymer, etc.) can be thermally stable having a melting point or thermal degradation temperature higher than 300° C. or even higher than 500° C. Some refractory metals and ceramic materials can have melting point as high as 3,500° C. The present invention now enables these low-elasticity materials to become suitable sealing materials, particularly for use in a high-temperature and/or high-pressure environment.

The binder or matrix material may contain a polymer selected from a thermoplastic resin, thermoset resin, rubber, thermoplastic elastomer, semi-interpenetrating network, simultaneous penetrating network, or a combination thereof. The rubber or thermoplastic elastomer may be selected from butadiene rubber (BR), butyl rubber (IIR), chlorosulfonated polyethylene (CSM), epichlorohydrin rubber (ECH, ECO), ethylene propylene diene monomer (EPDM), ethylene propylene rubber (EPR), fluoroelastomer (FKM): nitrile rubber (NBR, HNBR, HSN, Buna-N), perfluoroelastomer (FFKM), polyacrylate rubber (ACM), polychloroprene (neoprene) (CR), polyisoprene (IR), polysulfide rubber (PSR), polytetrafluoroethylene (PTFE), sanifluor (FEPM), silicone rubber (SiR), styrene-butadiene rubber (SBR), thermoplastic elastomer (TPE) styrenics, thermoplastic polyolefin (TPO, such as LDPE, HDPE, LLDPE, ULDPE), thermoplastic polyurethane (TPU), thermoplastic ether ester elastomers (TEEEs) copolyesters, thermoplastic polyamide (PEBA), melt processible rubber (MPR), thermoplastic vulcanizate (TPV), or a combination thereof.

In certain embodiments, as schematically illustrated in FIG. 2, the binder or matrix material occupies from 10% to 98% (more preferably from 20% to 90%) of the pore volume of the solid graphene foam shapes; preferably not all pores in the graphene foam shapes are occupied by the binder or matrix material. Preferably, the binder or matrix material occupies only an outer portion of a solid graphene foam shape, leaving behind a core portion free from the binder or matrix material.

The present invention provides a process for producing a graphene foam-based sealing material. The graphene foam structure is composed of multiple pores and pore walls. The pores in the graphene foam are formed slightly before, during, or after sheets of a graphene material are (1) chemically linked/merged together (edge-to-edge and/or face-to-face) typically at a temperature from 50 to 1,500° C. and/or (2) re-organized into larger graphite crystals or domains (herein referred to as re-graphitization) along the pore walls at a high temperature (typically >2,100° C. and more typically >2,500° C.). The pores also can be produced by activating a blowing agent. The process includes the production of graphene foam structure or frameworks, which are then coated, impregnated, or infiltrated with a permeation-resistant material.

In certain embodiments, the process comprises the following steps:

(a) preparing a graphene dispersion having a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent with a blowing agent-to-graphene material weight ratio from 0/1.0 to 1.0/1.0 (this blowing agent is normally required if the graphene material is pristine graphene, typically having a blowing agent-to-pristine graphene weight ratio from 0.01/1.0 to 1.0/1.0);

(b) dispensing and depositing the graphene dispersion to form one or a plurality of wet graphene shapes (typically elongated shapes, such as rods or filaments, and possibly in an O-ring shape), wherein the dispensing and depositing procedure (e.g. coating or casting) preferably includes subjecting the graphene dispersion to an orientation-inducing stress. This is followed by partially or completely removing the liquid medium from the wet graphene shapes to form dried graphene shapes typically and preferably having a content of non-carbon elements (e.g. O, H, N, B, F, Cl, Br, I, etc.) no less than 5% by weight (this non-carbon content, when being removed via heat-induced decomposition, produces volatile gases that act as a foaming agent or blowing agent);

(c) heat treating the first layer of graphene material at a first heat treatment temperature from 100° C. to 3,000° C. at a desired heating rate sufficient to induce volatile gas molecules from the non-carbon elements or to activate said blowing agent for producing one or multiple solid graphene foam shapes; and (d) coating or impregnating the one or a plurality of solid graphene foam shapes with a binder or matrix material to form one or a plurality of sealing material structures.

This coating or impregnating procedure may be conducted by using any known process of spraying, dipping, casting, molding, coating, etc. For instance, one may simply dip the graphene foam shape in and out of a metal melt (followed by cooling), polymer-solvent solution (followed by drying), or liquid monomer (followed by polymerizing and/or curing), etc. Alternatively, one may spray these melt, solution, or liquid onto a graphene foam structure, followed by roll-pressing and cooling, drying, or polymerizing.

Prior to coating or impregnation by a binder/matrix material, the graphene foam typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 2,600 m$^2$/g (more typically from 200 to 2,000 m$^2$/g, and most typically from 500 to 1,500 m$^2$/g).

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been taught or hinted that an aggregate of sheets of a graphene material can be converted into a graphene foam via a blowing agent. The cellular structure in a matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

(f) We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

In a preferred embodiment, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

For instance, as discussed in the Background section, the graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension. A chemical blowing agent may then be dispersed into the dispersion. This suspension is then cast or coated onto the surface of a solid substrate (e.g. glass sheet or Al foil). When heated to a desired temperature, the chemical blowing agent is activated or decomposed to generate volatile gases (e.g. $N_2$ or $CO_2$), which act to form bubbles or pores in an otherwise mass of solid graphene sheets, forming a pristine graphene foam.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The pore walls (cell walls) in the presently invented graphene foam contain chemically bonded and merged graphene planes. These planar aromatic molecules or graphene planes (hexagonal structured carbon atoms) are well interconnected physically and chemically. The lateral dimensions (length or width) of these planes are huge (from 20 nm to >10 μm), typically several times or even orders of magnitude larger than the maximum crystallite dimension (or maximum constituent graphene plane dimension) of the starting graphite particles. The graphene sheets or planes are essentially interconnected to form electron-conducting pathways with low resistance. This is a unique and new class of material that has not been previously discovered, developed, or suggested to possibly exist.

In order to illustrate how the presently invented process works to produce a graphene foam, we herein make use of graphene oxide (GO) and graphene fluoride (GF) as two examples. These should not be construed as limiting the scope of our claims. In each case, the first step involves preparation of a graphene dispersion (e.g. GO+water or GF+organic solvent, DMF) containing an optional blowing agent. If the graphene material is pristine graphene containing no non-carbon elements, a blowing agent is required.

In step (b), the GF or GO suspension is formed into a wet GF or GO layer on a solid substrate surface (e.g. PET film or glass) preferably under the influence of a shear stress. One example of such a shearing procedure is casting or coating a thin film of GF or GO suspension using a coating machine. This procedure is similar to a layer of varnish, paint, coating, or ink being coated onto a solid substrate. The roller, "doctor's blade", or wiper creates a shear stress when the film is shaped, or when there is a relative motion between the roller/blade/wiper and the supporting substrate. Quite unexpectedly and significantly, such a shearing action enables the planar GF or GO sheets to well align along, for instance, a shearing direction. Further surprisingly, such a molecular alignment state or preferred orientation is not disrupted when the liquid components in the GF or GO suspension are subsequently removed to form a well-packed layer of highly aligned GF or GO sheets that are at least partially dried. The dried GF or GO mass has a high birefringence coefficient between an in-plane direction and the normal-to-plane direction.

In an embodiment, this GF or GO layer is then subjected to a heat treatment to activate the blowing agent and/or the thermally-induced reactions that remove the non-carbon elements (e.g. F, O, etc.) from the graphene sheets to generate volatile gases as by-products. These volatile gases generate pores or bubbles inside the solid graphene material, pushing solid graphene sheets into a wall structure, forming a graphene oxide foam. If no blowing agent is added, the non-carbon elements in the graphene material preferably occupy at least 10% by weight of the graphene material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80-1,500° C. Quite surprisingly, the chemical linking or merging between graphene planes (GO or GF planes) in an edge-to-edge and face-to-face manner can occur at a relatively low heat treatment temperature (e.g. as low as from 150 to 300° C.).

The foamed graphene material may be subjected to a further heat treatment that involves at least a second temperature that is significantly higher than the first heat treatment temperature.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried graphene layer experiences may be divided into four distinct HTT regimes:

Regime 1 (80° C. to 300° C.): In this temperature range (the thermal reduction regime and also the activation regime for a blowing agent, if present), a GO or GF layer primarily undergoes thermally-induced reduction reactions, leading to a reduction of oxygen content or fluorine content from typically 20-50% (of O in GO) or 10-25% (of F in GF) to approximately 5-6%. This treatment results in a reduction of inter-graphene spacing in foam walls from approximately 0.6-1.2 nm (as dried) down to approximately 0.4 nm, and an increase in thermal conductivity to 200 W/mK per unit specific gravity and/or electrical conductivity to 2,000 S/cm per unit of specific gravity. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between graphene sheets occurs. The inter-GO or inter-GF planar spacing remains relatively large (0.4 nm or larger). Many O- or F-containing functional groups survive.

Regime 2 (300° C.-1,500° C.): In this chemical linking regime, extensive chemical combination, polymerization, and cross-linking between adjacent GO or GF sheets occur. The oxygen or fluorine content is reduced to typically <1.0% (e.g. 0.7%) after chemical linking, resulting in a reduction of inter-graphene spacing to approximately 0.345 nm. This implies that some initial re-graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene foam and its production processes. These chemical linking reactions result in an increase in thermal conductivity to 250 W/mK per unit of specific gravity, and/or electrical conductivity to 2,500-4,000 S/cm per unit of specific gravity.

Regime 3 (1,500-2,500° C.): In this ordering and re-graphitization regime, extensive graphitization or graphene plane merging occurs, leading to significantly improved degree of structural ordering in the foam walls. As a result, the oxygen or fluorine content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains in the foam walls, which can be orders of magnitude larger than the original grain sizes of the starting graphite particles for the production of GO or GF. The oxygen or fluorine content is essentially eliminated, typically 0%-0.001%. The inter-graphene spacing is reduced to down to approximately 0.3354 nm (degree of graphitization from 80% to nearly 100%), corresponding to that of a perfect graphite single crystal. The foamed structure thus obtained exhibits a thermal conductivity of >400 W/mK per unit of specific gravity, and electrical conductivity of >4,000 S/cm per unit of specific gravity.

The presently invented graphene foam structure can be obtained by heat-treating the dried GO or GF layer with a temperature program that covers at least the first regime (typically requiring 1-4 hours in this temperature range if the temperature never exceeds 500° C.), more commonly covers the first two regimes (1-2 hours preferred), still more commonly the first three regimes (preferably 0.5-2.0 hours in Regime 3), and can cover all the 4 regimes (including Regime 4 for 0.2 to 1 hour, may be implemented to achieve the highest conductivity).

If the graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, or a combination thereof, and wherein the maximum heat treatment temperature (e.g. both the first and second heat treatment temperatures) is (are) less than 2,500°

C., then the resulting solid graphene foam typically contains a content of non-carbon elements in the range from 0.01% to 2.0% by weight (non-pristine graphene foam).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354\ g+0.344\ (1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range from 0.4-0.7 if the HTT is between 1,500 and 2,500° C., and in the range from 0.7-1.0 if the HTT is between 300 and 1,500° C.

Figure 3:
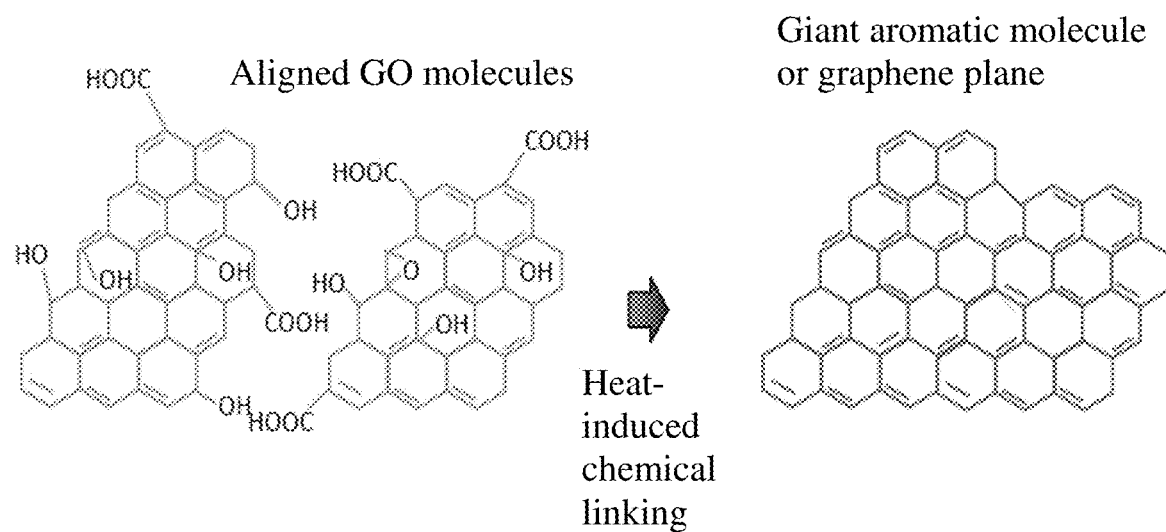
FIG. 3 A possible mechanism of chemical linking between graphene oxide sheets, which mechanism effectively increases the graphene sheet lateral dimensions and improves the structural integrity (including elasticity) of the graphene foam.

Illustrated in FIG. 3 is a plausible chemical linking mechanism where only 2 aligned GO molecules are shown as an example, although a large number of GO molecules can be chemically linked together to form a foam wall. Further, chemical linking could also occur face-to-face, not just edge-to-edge for GO, GF, and chemically functionalized graphene sheets. These linking and merging reactions proceed in such a manner that the molecules are chemically merged, linked, and integrated into one single entity. The graphene sheets (GO or GF sheets) completely lose their own original identity and they no longer are discrete sheets/platelets/flakes. The resulting product is not a simple aggregate of individual graphene sheets, but a single entity that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if the HTT is sufficiently high (e.g. >1,500° C. or much higher), these graphene planes are essentially bonded together with one another.

In-depth studies using a combination of SEM, TEM, selected area diffraction, X-ray diffraction, AFM, Raman spectroscopy, and FTIR indicate that the graphene foam walls are composed of several huge graphene planes (with length/width typically >>20 nm, more typically >>100 nm, often >>1 µm, and, in many cases, >>10 µm, or even >>100 µm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

(1) This graphene foam wall is not made by gluing or bonding discrete flakes/platelets together with a resin binder, linker, or adhesive. Instead, GO sheets (molecules) from the GO dispersion or the GF sheets from the GF dispersion are merged through joining or forming of covalent bonds with one another, into an integrated graphene entity, without using any externally added linker or binder molecules or polymers.

(2) This graphene foam wall is typically a poly-crystal composed of large grains having incomplete grain boundaries. This entity is derived from a GO or GF suspension, which is in turn obtained from natural graphite or artificial graphite particles originally having multiple graphite crystallites. Prior to being chemically oxidized or fluorinated, these starting graphite crystallites have an initial length ($L_a$ in the crystallographic a-axis direction), initial width ($L_b$ in the b-axis direction), and thickness ($L_c$ in the c-axis direction). Upon oxidation or fluorination, these initially discrete graphite particles are chemically transformed into highly aromatic graphene oxide or graphene fluoride molecules having a significant concentration of edge- or surface-borne functional groups (e.g. —F, —OH, —COOH, etc.). These aromatic GO or GF molecules in the suspension have lost their original identity of being part of a graphite particle or flake. Upon removal of the liquid component from the suspension, the resulting GO or GF molecules form an essentially amorphous structure. Upon heat treatments, these GO or GF molecules are chemically merged and linked into a unitary or monolithic graphene entity that constitutes the foam wall. This foam wall is highly ordered.

The resulting unitary graphene entity in the foam wall typically has a length or width significantly greater than the $L_a$ and $L_b$ of the original crystallites. The length/width of this graphene foam wall entity is significantly greater than the $L_a$ and $L_b$ of the original crystallites. Even the individual grains in a poly-crystalline graphene wall structure have a length or width significantly greater than the $L_a$ and $L_b$ of the original crystallites.

(3) Due to these unique chemical composition (including oxygen or fluorine content), morphology, crystal structure (including inter-graphene spacing), and structural features (e.g. high degree of orientations, few defects, incomplete grain boundaries, chemical bonding and no gap between graphene sheets, and substantially no interruptions in graphene planes), the GO- or GF-derived graphene foam has a unique combination of outstanding thermal conductivity, electrical conductivity, mechanical strength, and stiffness (elastic modulus).

Figure 1A:
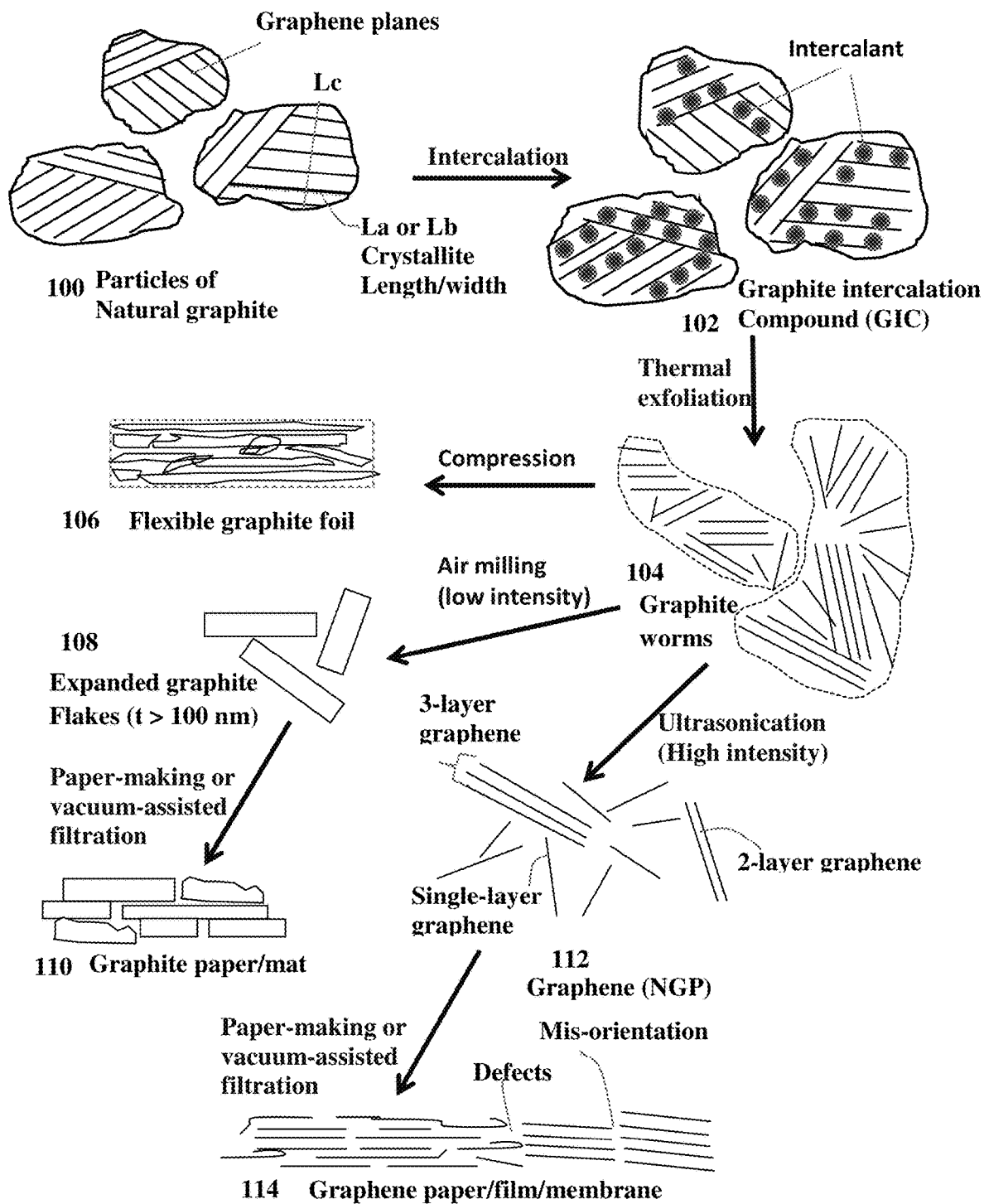
FIG. 1(A) Schematic drawing illustrating the processes for producing conventional paper, mat, film, and membrane of simply aggregated graphite or NGP flakes/platelets. All processes begin with intercalation and/or oxidation treatment of graphitic materials (e.g. natural graphite particles).

The aforementioned features are further described and explained in detail as follows: As illustrated in FIG. 1(A), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(A), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(A)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

Figure 1B:
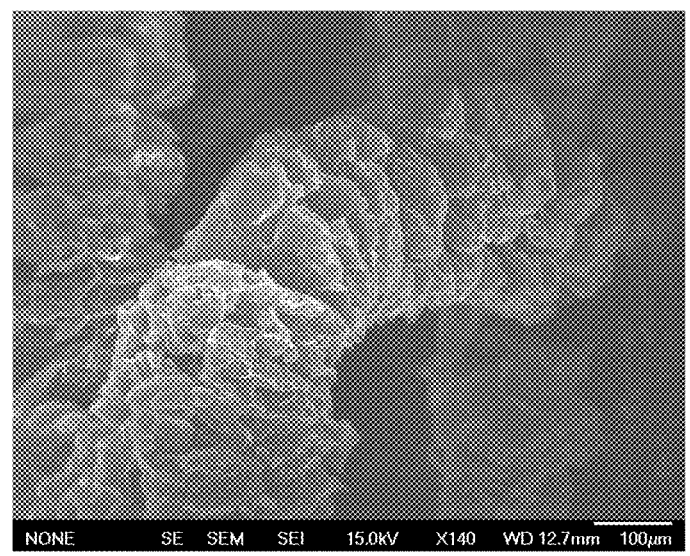
FIG. 1(B) A SEM image of a graphite worm sample after thermal exfoliation of graphite intercalation compounds (GICs) or graphite oxide powders.

The processes typically begin with intercalating graphite particles (e.g., natural graphite or synthetic graphite) with an intercalant (typically a strong acid or acid mixture) to obtain a graphite intercalation compound (GIC). After rinsing in water to remove excess acid, the GIC becomes "expandable graphite." The GIC or expandable graphite is then exposed to a high temperature environment (e.g., in a tube furnace preset at a temperature in the range from 800-1,050° C.) for a short duration of time (typically from 15 seconds to 2 minutes). This thermal treatment allows the graphite to expand in its c-axis direction by a factor of 30 to several hundreds to obtain a worm-like vermicular structure (graphite worm), which contains exfoliated, but un-separated graphite flakes with large pores interposed between these interconnected flakes. An example of graphite worms is presented in FIG. 1(B).

In one prior art process, the exfoliated graphite (or mass of graphite worms) is re-compressed by using a calendaring or roll-pressing technique to obtain flexible graphite foils (106 in FIG. 1(A)), which are typically 100-300 μm thick. In another prior art process, the exfoliated graphite worm may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nanographene platelets (NGPs) with all the graphene platelets thinner than 100 nm, mostly thinner than 10 nm, and, in many cases, being single-layer graphene (also illustrated as 112 in FIG. 1(A)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide) may be made into a graphene film/paper (114 in FIG. 1(A)) using a film- or paper-making process.

Further alternatively, with a low-intensity shearing, graphite worms tend to be separated into the so-called expanded graphite flakes (108 in FIG. 1(A) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

The following examples are used to illustrate some specific details about the best modes of practicing the instant invention and should not be construed as limiting the scope of the invention.

Example 1: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second dispersed phase (sheets of graphene material being the first dispersed phase) in the suspension, which can be deposited onto the solid supporting substrate to form a wet layer. This wet layer of graphene material may then be dried and heat treated to activate the chemical blowing agent. After a chemical blowing agent is activated and bubbles are generated, the resulting foamed graphene structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bicarbonate (baking soda), hydrazine, hydrazide, azodicarbonamide (exothermic chemical blowing agents), nitroso compounds (e.g. N,N-dinitroso pentamethylene tetramine), hydrazine derivatives (e.g. 4.4'-oxybis (benzenesulfonyl hydrazide) and hydrazo dicarbonamide), and hydrogen carbonate (e.g. sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt). We have surprisingly observed that a physical blowing agent (e.g. $CO_2$ or $N_2$) can be injected into the stream of graphene suspension prior to being coated or cast onto the supporting substrate. This would result in a foamed structure even when the liquid medium (e.g. water and/or alcohol) is removed. The dried layer of graphene material is capable of maintaining a controlled amount of pores or bubbles during liquid removal and subsequent heat treatments.

Technically feasible blowing agents include carbon dioxide ($CO_2$), nitrogen ($N_2$), isobutane ($C_4H_{10}$), cyclopentane ($C_5H_{10}$), pentane, isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$).

Except for chlorofluorocarbons, all the blowing agents recited above have been tested in our experiments. For both physical blowing agents and chemical blowing agents, the blowing agent amount introduced into the suspension is defined as a blowing agent-to-graphene material weight ratio, which is typically from 0/1.0 to 1.0/1.0.

Example 2: Preparation of Discrete Nanographene Platelets (NGPs) and RGO Foam

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a stainless steel mold having an O-ring-shaped groove. A wiper was used to exert shear stresses, inducing GO sheet orientations. The wet ring-shaped GO suspension was then dried.

For making a graphene foam specimen, the ring-shaped GO suspension was then subjected to heat treatments that typically involve an initial thermal reduction temperature of 80-350° C. for 1-8 hours, followed by heat-treating at a second temperature of 1,500-2,850° C. for 0.5 to 5 hours. We have found it essential to apply a compressive stress to the sample while being subjected to the first heat treatment. This compress stress seems to have helped maintain good contacts between the graphene sheets so that chemical merging and linking between graphene sheets can occur while pores are being formed. Without such a compressive stress, the heat-treated sample was typically excessively porous with constituent graphene sheets in the pore walls being very poorly oriented and incapable of chemical merging and linking with one another. As a result, the thermal conductivity, electrical conductivity, and mechanical strength of the graphene foam were compromised.

The resulting graphene foam structures were then separately dipped in polysiloxane solution, polyurethane monomer mixture, and petroleum pitch melt, respectively, to prepare graphene-silicone rubber, graphene-polyurethane, and graphene-pitch composite ring shapes. The graphene-pitch ring shapes were then subjected to carbonization at 500° C. for 1 hour and 800° C. for 2-5 hours to prepare graphene-carbon composite O-rings.

Example 3: Preparation of Single-Layer Graphene Sheets and Graphene Foam from Mesocarbon Microbeads (MCMBs)

Mesocarbon microbeads (MCMBs) were supplied from China Steel Chemical Co., Kaohsiung, Taiwan. This material has a density of about 2.24 $g/cm^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Baking soda (5-20% by weight), as a chemical blowing agent, was added to the suspension just prior to casting. The suspension was then cast onto several grooves on a steel surface. Several samples were cast, some containing a blowing agent and some not. The resulting GO rods, after removal of liquid, have a thickness that can be varied from approximately 1 mm to 10 mm.

These GO rods, with or without a blowing agent contained therein, were then subjected to heat treatments that involve an initial (first) thermal reduction temperature of 80-500° C. for 1-5 hours. This first heat treatment generated a graphene foam. However, the graphene domains in the foam wall can be further perfected (re-graphitized to become more ordered or having a higher degree of crystallinity and larger lateral dimensions of graphene planes, longer than the original graphene sheet dimensions due to chemical merging) if the foam is followed by heat-treating at a second temperature of 1,500-2,850° C. Some rods of graphene foam were bent over to form an O-ring shape and then impregnated with a polymer (uncured isoprene rubber solution, followed by curing) and a metal (molten Zn, followed by solidification), respectively, to prepare graphene-rubber and graphene-Zn composite O-rings.

Example 4: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N,N-dinitroso pentamethylene tetramine or 4.4'-oxybis (benzenesulfonyl hydrazide) were added to a suspension containing pristine graphene sheets and a surfactant. The suspension was then cast onto a glass surface using a doctor's blade to exert shear stresses, inducing graphene sheet orientations. Several samples were cast, including one that was made using $CO_2$ as a physical blowing agent introduced into the suspension just prior to casting). The resulting graphene suspension shapes, after removal of liquid, have a thickness that can be varied from approximately 0.1 mm to 50 mm.

The graphene shapes were then subjected to heat treatments that involve an initial (first) thermal reduction temperature of 80-1,500° C. for 1-5 hours. This first heat treatment generated a graphene foam structure. Some of the pristine foam samples were then subjected to a second temperature of 1,500-2,850° C. to determine if the graphene domains in the foam wall could be further perfected (re-graphitized to become more ordered or having a higher degree of crystallinity).

Comparative Example 4-a: CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

Comparative Example 4-b: Conventional Graphitic Foam from Pitch-Based Carbon Foams Pitch powder, granules, or pellets are placed in an aluminum mold with the desired final shape of the foam. Mitsubishi ARA-24 mesophase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Samples from the foam were machined into specimens for measuring the thermal conductivity. The bulk thermal conductivity ranged from 67 W/mK to 151 W/mK. The density of the samples was from 0.31-0.61 g/cm³. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm³ was measured to be 3.6 MPa and the compression modulus was measured to be 74 MPa. By contrast, the compression strength and compressive modulus of the presently invented graphene foam samples derived from GO having a comparable physical density are 5.7 MPa and 103 MPa, respectively.

Figure 4A:
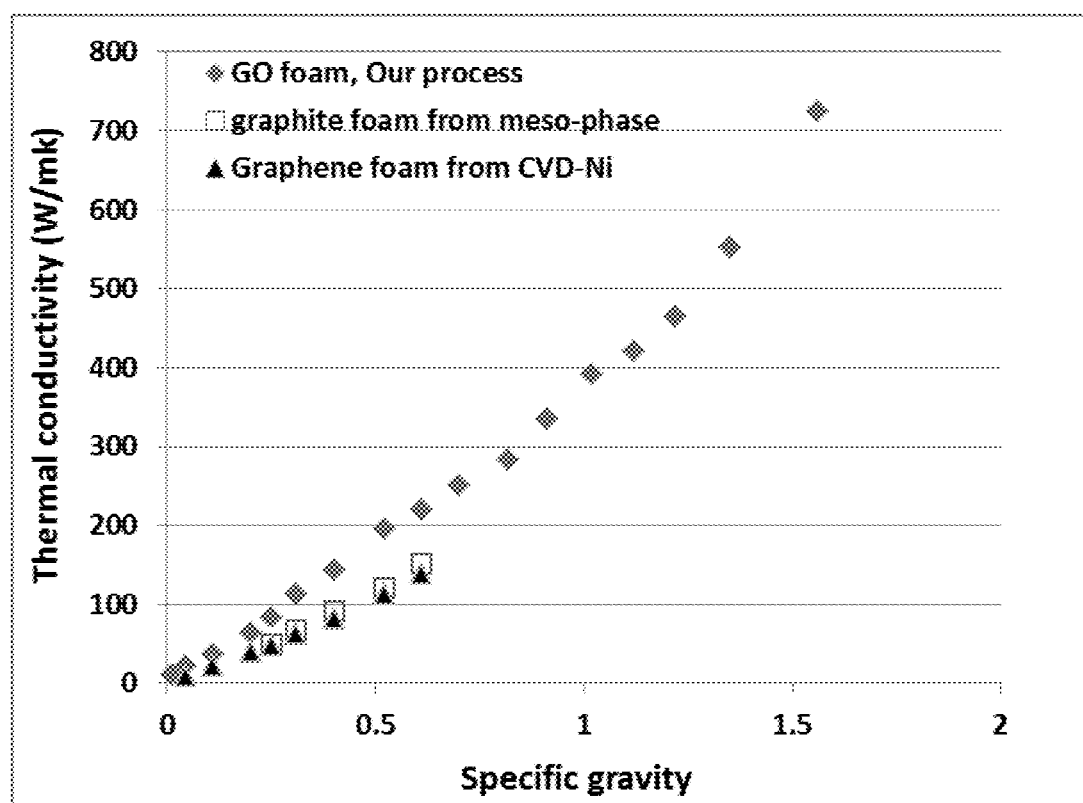
FIG. 4(A) Thermal conductivity values vs. specific gravity of the GO suspension-derived foam produced by the presently invented process, mesophase pitch-derived graphite foam, and Ni foam-template assisted CVD graphene foam.
Figure 5A:
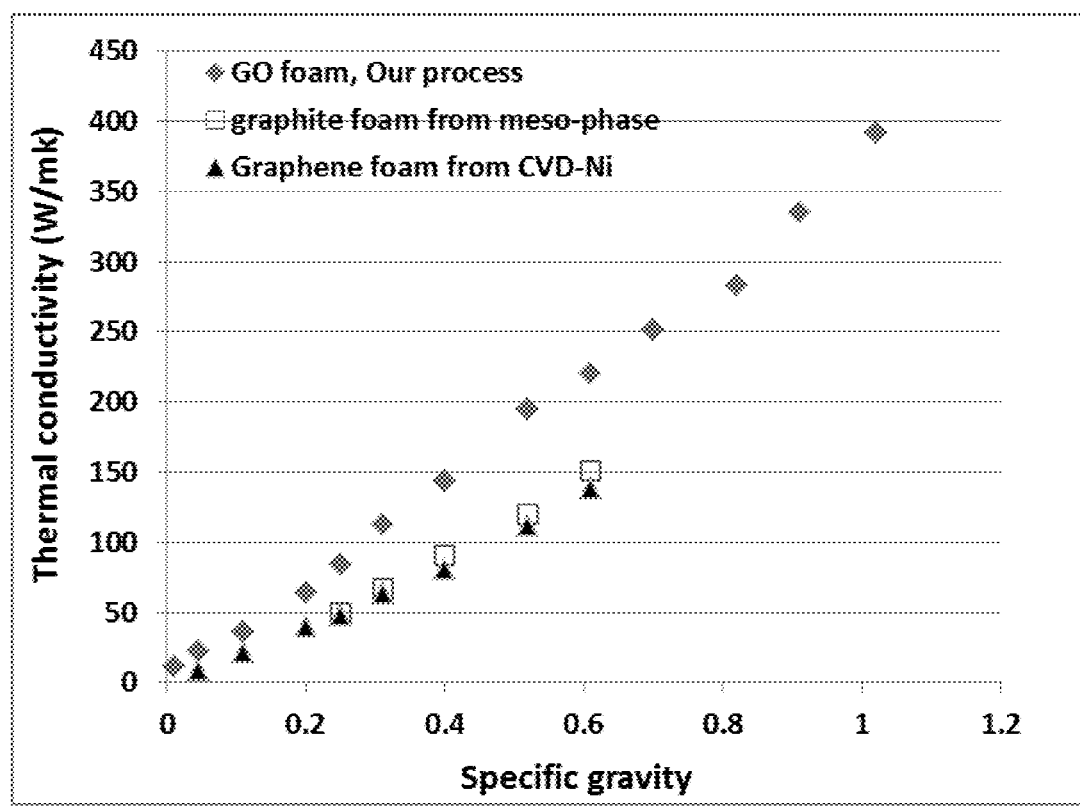
FIG. 5(A) Thermal conductivity values (vs. specific gravity values up to 1.02 g/cm$^3$) of the GO suspension-derived foam, mesophase pitch-derived graphite foam, and Ni foam-template assisted CVD graphene foam.

Shown in FIG. 4(A) and FIG. 5(A) are the thermal conductivity values vs. specific gravity of the GO suspension-derived foam, mesophase pitch-derived graphite foam, and Ni foam template-assisted CVD graphene foam. These data clearly demonstrate the following unexpected results:
1) GO-derived graphene foams produced by the presently invented process exhibit significantly higher thermal conductivity as compared to both mesophase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a much higher thermal conductivity compared to graphene oxide (GO). GO is known to be highly defective (having a high defect population and, hence, low conductivity) even after the oxygen-containing functional groups are removed via conventional thermal or chemical reduction methods. These exceptionally high thermal conductivity values observed with the GO-derived graphene foams herein produced are much to our surprise.
3) FIG. 5(A) presents the thermal conductivity values over comparable ranges of specific gravity values to allow for calculation of specific conductivity (conductivity value, W/mK, divided by physical density value, g/cm$^3$) for all three graphitic foam materials based on the slopes of the curves (approximately straight lines at different segments). These specific conductivity values enable a fair comparison of thermal conductivity values of these three types of graphitic foams given the same amount of solid graphitic material in each foam. These data provide an index of the intrinsic conductivity of the solid portion of the foam material. These data clearly indicate that, given the same amount of solid material, the presently invented GO-derived foam is intrinsically most conducting, reflecting a high level of graphitic crystal perfection (larger crystal dimensions, fewer grain boundaries and other defects, better crystal orientation, etc.). This is also unexpected.
4) The specific conductivity values of the presently invented GO- and GF-derived foam exhibit values from 250 to 500 W/mK per unit of specific gravity; but those of the other two foam materials are typically lower than 250 W/mK per unit of specific gravity.

Figure 7:
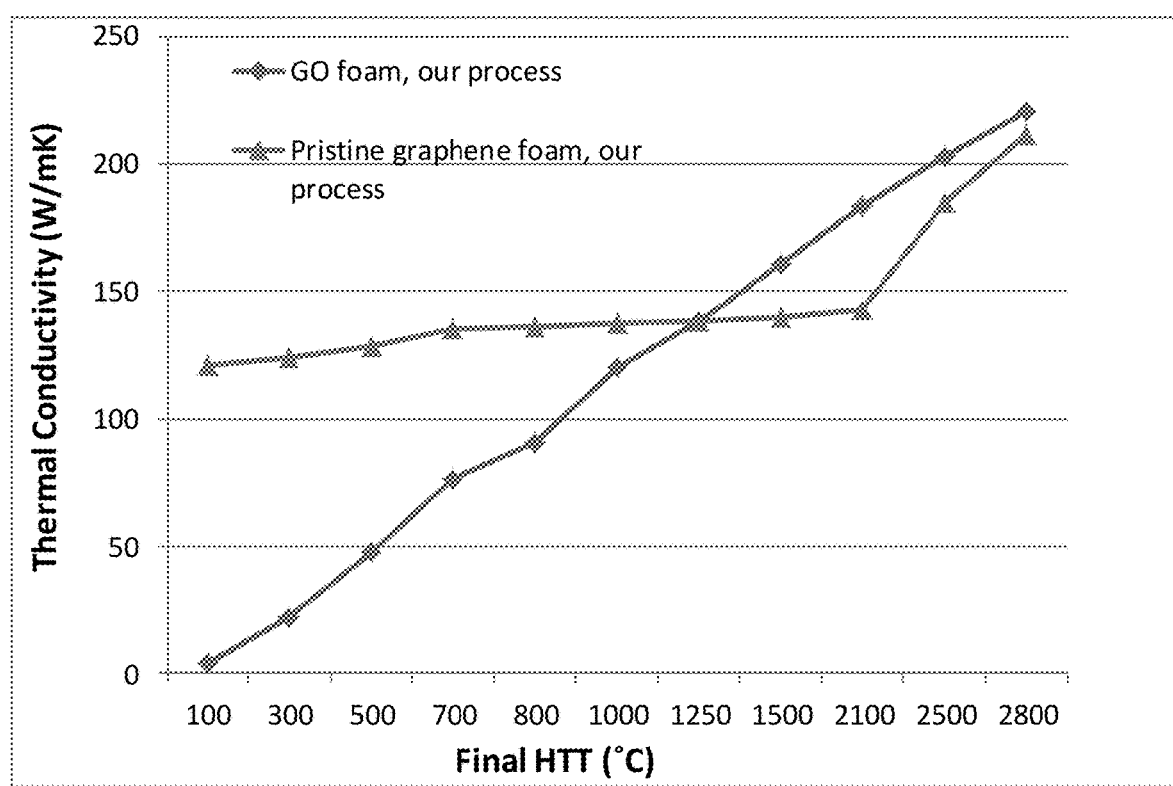
FIG. 7 Thermal conductivity values of graphene foam samples derived from GO and pristine graphene as a function of the final (maximum) heat treatment temperature.

Summarized in FIG. 7 are thermal conductivity data for a series of GO-derived graphene foams and a series of pristine graphene derived foams, both plotted over the final (maximum) heat treatment temperatures. These data indicate that the thermal conductivity of the GO foams is highly sensitive to the final heat treatment temperature (HTT). Even when the HTT is very low, clearly some type of graphene merging or crystal perfection reactions are already activated. The thermal conductivity increases monotonically with the final HTT. In contrast, the thermal conductivity of pristine graphene foams remains relatively constant until a final HTT of approximately 2,500° C. is reached, signaling the beginning of a re-crystallization and perfection of graphite crystals. There are no functional groups in pristine graphene, such as —COOH in GO, that enable chemical linking of graphene sheets at relatively low HTTs. With a HTT as low as 1,250° C., GO sheets can merge to form significantly larger graphene sheets with reduced grain boundaries and other defects. Even though GO sheets are intrinsically more defective than pristine graphene, the presently invented process enables the GO sheets to form graphene foams that outperform pristine graphene foams. This is another unexpected result.

Example 5: Preparation of Graphene Oxide (GO) Suspension from Natural Graphite and of Subsequent GO Foams Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 µm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

By dispensing and coating the GO suspension on a polyethylene terephthalate (PET) film in a slurry coater and removing the liquid medium from the coated film we obtained a thin film of dried graphene oxide. Several GO film samples were then subjected to different heat treatments, which typically include a thermal reduction treatment at a first temperature of 100° C. to 500° C. for 1-10 hours, and at a second temperature of 1,500° C.-2,850° C. for 0.5-5 hours. With these heat treatments, also under a compressive stress, the GO films were transformed into graphene foam.

Comparative Example 5-a: Graphene Foams from Hydrothermally Reduced Graphene Oxide For comparison, a self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented graphene foams produced by heat treating at the same temperature.

Comparative Example 5-b: Plastic Bead Template-Assisted Formation of Reduced Graphene Oxide Foams A hard template-directed ordered assembly for a macro-porous bubbled graphene film (MGF) was prepared. Monodisperse poly methyl methacrylate (PMMA) latex spheres were used as the hard templates. The GO liquid crystal prepared in Example 5 was mixed with a PMMA spheres suspension. Subsequent vacuum filtration was then conducted to prepare the assembly of PMMA spheres and GO sheets, with GO sheets wrapped around the PMMA beads. A composite film was peeled off from the filter, air dried and calcinated at 800° C. to remove the PMMA template and thermally reduce GO into RGO simultaneously. The grey free-standing PMMA/GO film turned black after calcination, while the graphene film remained porous.

Figure 4B:
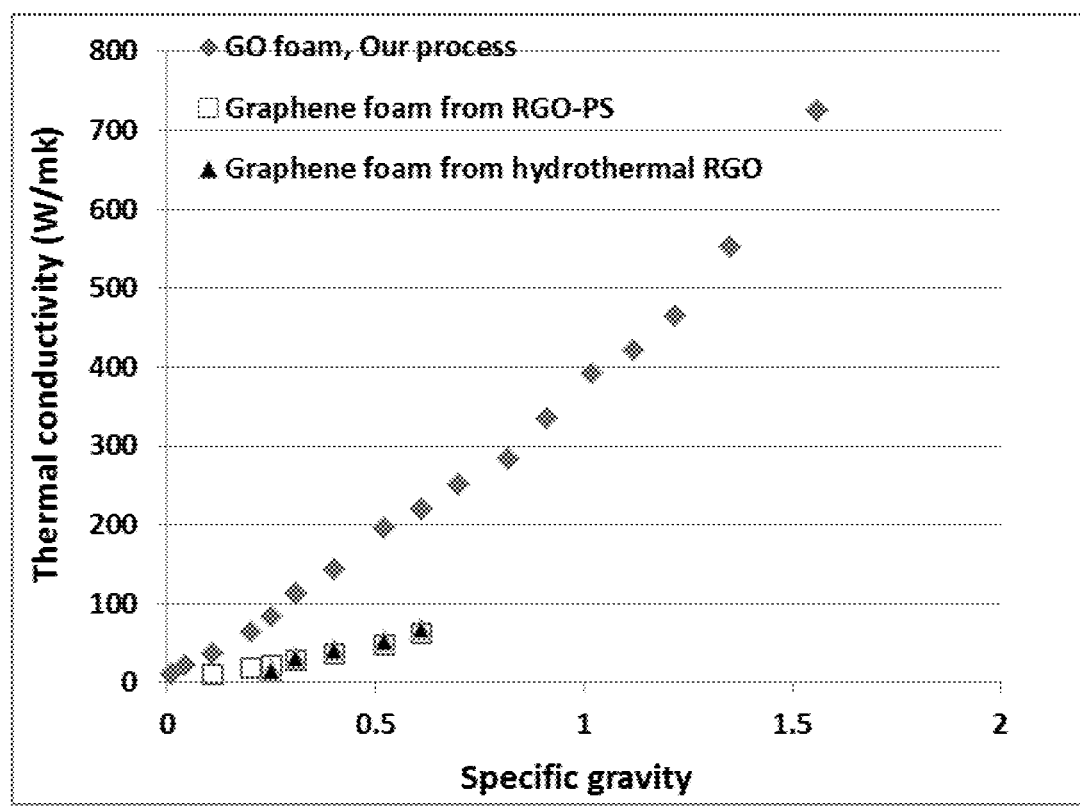
FIG. 4(B) Thermal conductivity values of the GO suspension-derived foam, sacrificial plastic bead-templated GO foam, and the hydrothermally reduced GO graphene foam.
Figure 4C:
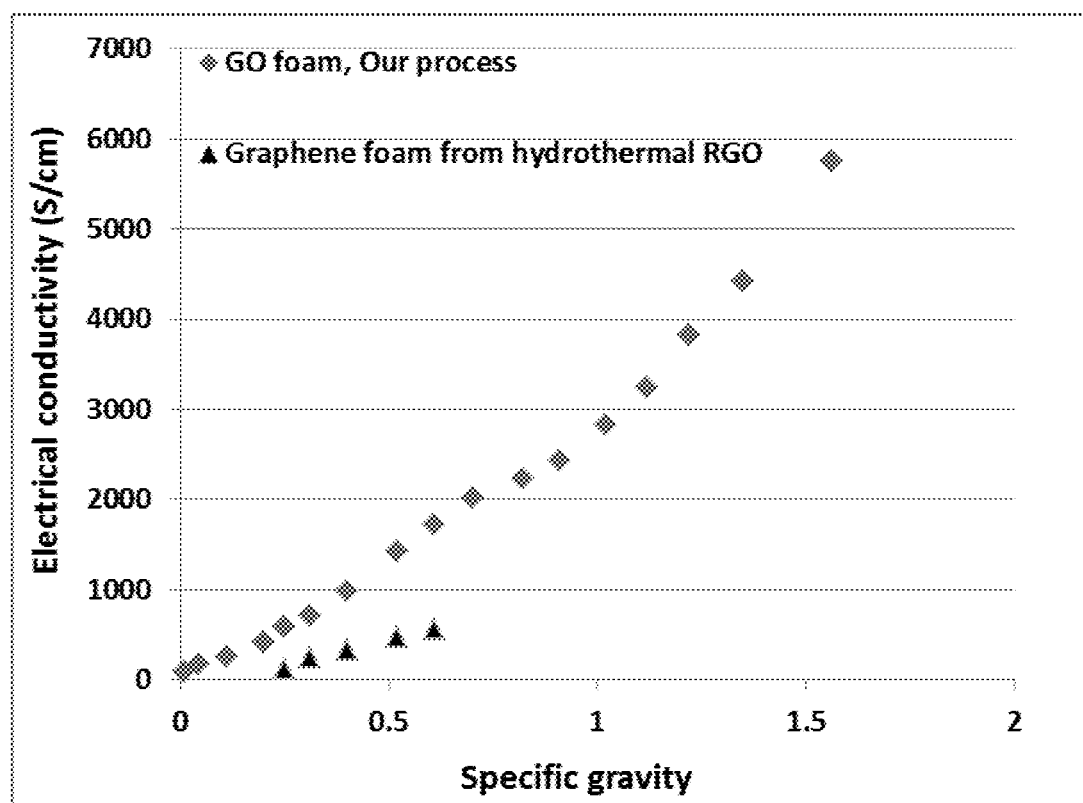
FIG. 4(C) electrical conductivity data for the GO suspension-derived foam produced by the presently invented process and the hydrothermally reduced GO graphene foam.
Figure 5B:
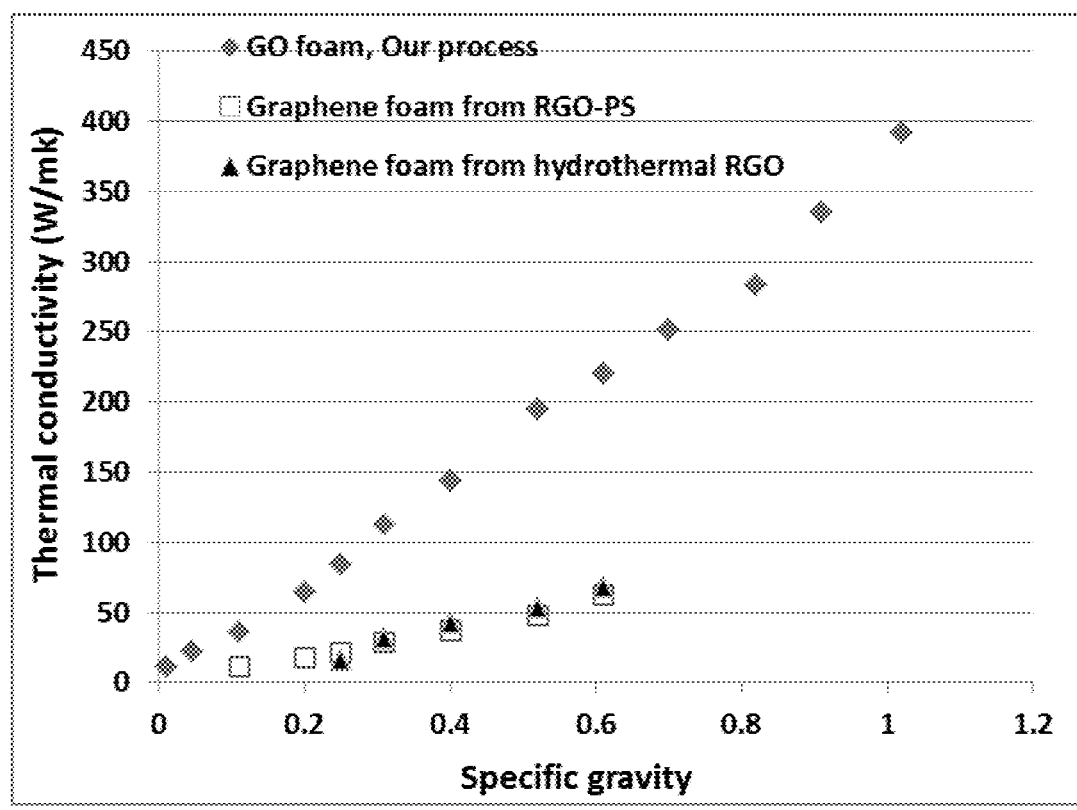
FIG. 5(B) Thermal conductivity values of the GO suspension-derived foam, sacrificial plastic bead-templated GO foam, and hydrothermally reduced GO graphene foam (vs. specific gravity values up to 1.02 g/cm$^3$).

FIG. 4(B) and FIG. 5(B) show the thermal conductivity values of the presently invented GO suspension-derived foam, GO foam produced via sacrificial plastic bead template-assisted process, and hydrothermally reduced GO graphene foam. Most surprisingly, given the same starting GO sheets, the presently invented process produces the highest-performing graphene foams. Electrical conductivity data summarized in FIG. 4(C) are also consistent with this conclusion. These data further support the notion that, given the same amount of solid material, the presently invented GO suspension deposition (with stress-induced orientation) and subsequent heat treatments give rise to a graphene foam that is intrinsically most conducting, reflecting a highest level of graphitic crystal perfection (larger crystal dimensions, fewer grain boundaries and other defects, better crystal orientation, etc. along the pore walls).

It is of significance to point out that all the prior art processes for producing graphite foams or graphene foams appear to provide macro-porous foams having a physical density in the range from approximately 0.2-0.6 g/cm$^3$ only with pore sizes being typically too large (e.g. from 20 to 300 μm) for most of the intended applications. In contrast, the instant invention provides processes that generate graphene foams having a density that can be as low as 0.01 g/cm$^3$ and as high as 1.7 g/cm$^3$. The pore sizes can be varied between mesoscaled (2-50 nm) up to macro-scaled (1-500 μm) depending upon the contents of non-carbon elements and the amount/type of blowing agent used. This level of flexibility and versatility in designing various types of graphene foams is unprecedented and un-matched by any prior art process.

Example 6: Preparation of Graphene Foams from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability. Upon casting on a glass surface with the solvent removed, the dispersion became a brownish film formed on the glass surface. When GF films were heat-treated, fluorine was released as gases that helped to generate pores in the film. In some samples, a physical blowing agent ($N_2$ gas) was injected into the wet GF film while being cast. These samples exhibit much higher pore volumes or lower foam densities. Without using a blowing agent, the resulting graphene fluoride foams exhibit physical densities from 0.35 to 1.38 g/cm$^3$. When a blowing agent was used (blowing agent/GF weight ratio from 0.5/1 to 0.05/1), a density from 0.02 to 0.35 g/cm$^3$ was obtained. Typical fluorine contents are from 0.001% (HTT=2,500° C.) to 4.7% (HTT=350° C.), depending upon the final heat treatment temperature involved.

Figure 6:
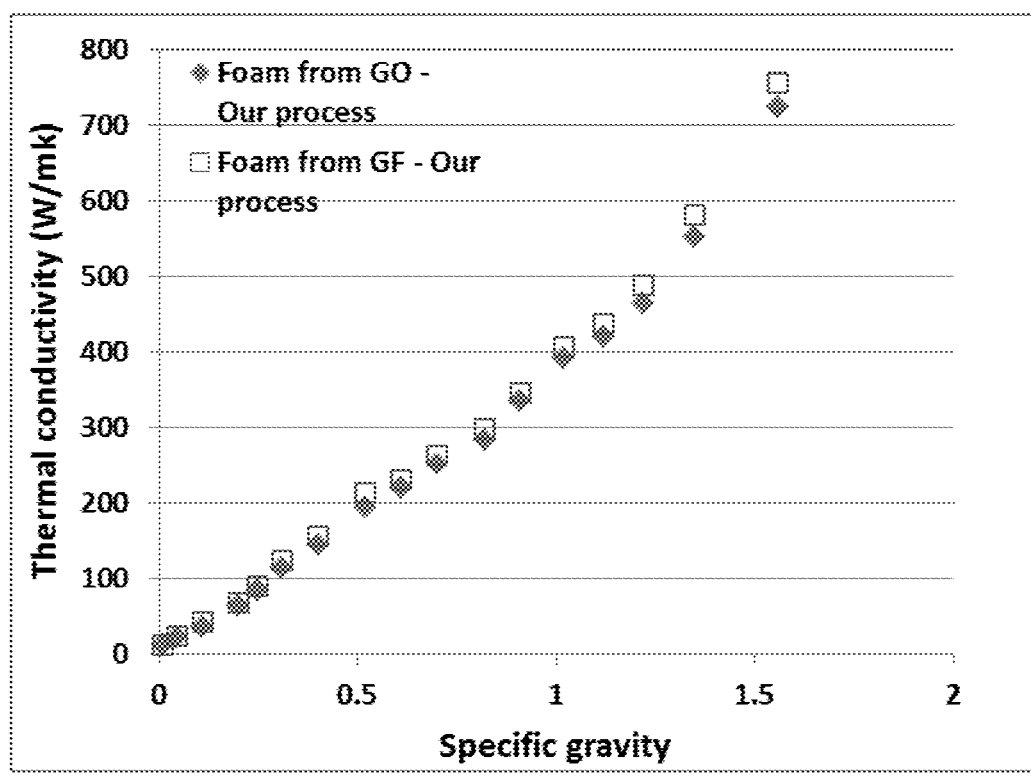
FIG. 6 Thermal conductivity values of graphene foam samples derived from GO and GF (graphene fluoride) as a function of the specific gravity.

FIG. 6 presents a comparison in thermal conductivity values of the graphene foam samples derived from GO and GF (graphene fluoride), respectively, as a function of the specific gravity. It appears that the GF foams, in comparison with GO foams, exhibit higher thermal conductivity values at comparable specific gravity values. Both deliver impressive heat-conducting capabilities, being the best among all known foamed materials.

Example 7: Preparation of Graphene Foams from Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions were then cast, dried, and heat-treated initially at 200-350° C. as a first heat treatment temperature and subsequently treated at a second temperature of 1,500° C. The resulting nitrogenated graphene foams exhibit physical densities from 0.45 to 1.28 g/cm$^3$. Typical nitrogen contents of the foams are from 0.01% (HTT=1,500° C.) to 5.3% (HTT=350° C.), depending upon the final heat treatment temperature involved.

Example 8: Characterization of Various Graphene Foams and Conventional Graphite Foam The internal structures (crystal structure and orientation) of several dried GO layers, and the heat-treated films at different stages of heat treatments were investigated using X-ray diffraction. The X-ray diffraction curve of natural graphite typically exhibits a peak at approximately 2θ=26°, corresponds to an inter-graphene spacing ($d_{002}$) of approximately 0.3345 nm. Upon oxidation, the resulting GO shows an X-ray diffraction peak at approximately 2θ=12°, which corresponds to an inter-graphene spacing ($d_{002}$) of approximately 0.7 nm. With some heat treatment at 150° C., the dried GO compact exhibits the formation of a hump centered at 22°, indicating that it has begun the process of decreasing the inter-graphene spacing due to the beginning of chemical linking and ordering processes. With a heat treatment temperature of 2,500° C. for one hour, the $d_{002}$ spacing has decreased to approximately 0.336, close to 0.3354 nm of a graphite single crystal.

With a heat treatment temperature of 2,750° C. for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g. highly oriented pyrolytic graphite, HOPG) is in the range from 0.2-0.5. In contrast, a graphene foam prepared with a final HTT of 2,750° C. for one hour exhibits a I(004)/I(002) ratio of 0.78 and a Mosaic spread value of 0.21, indicating a practically perfect graphene single crystal with a good degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.2-0.4 when produced using a final heat treatment temperature no less than 2,500° C.

Figure 8A:
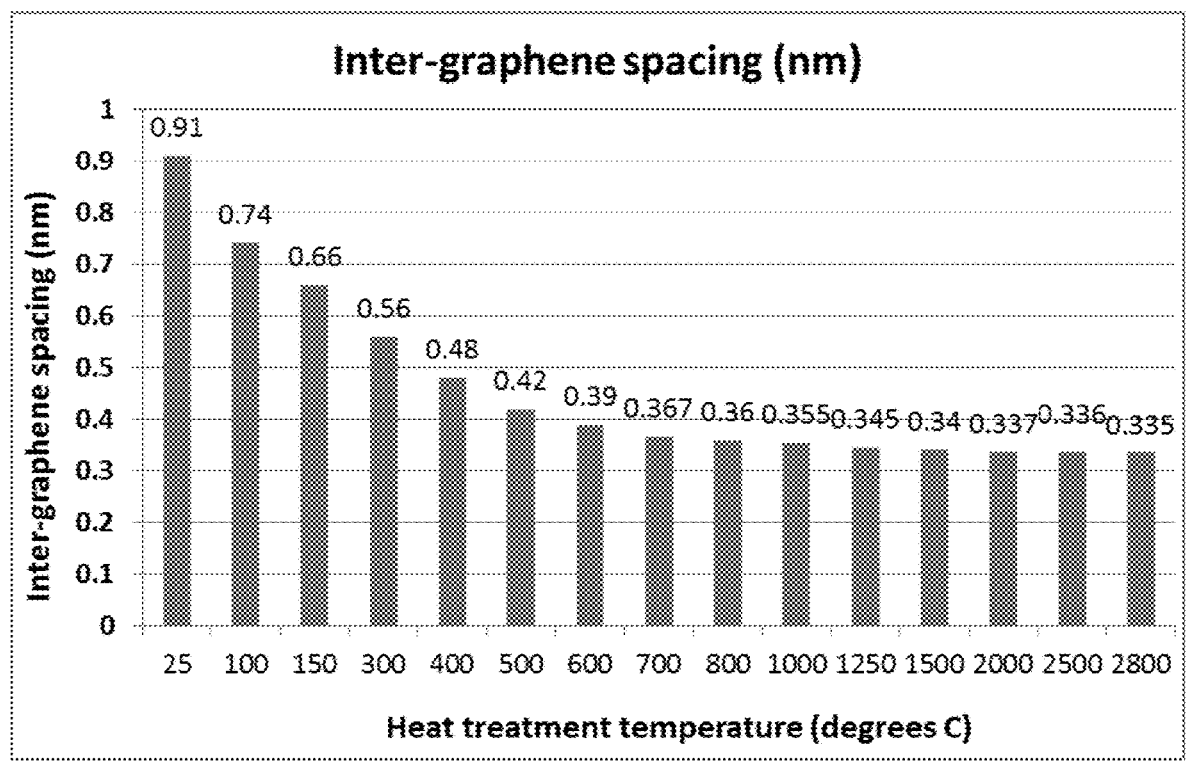
FIG. 8(A) Inter-graphene plane spacing in graphene foam walls as measured by X-ray diffraction.
Figure 8B:
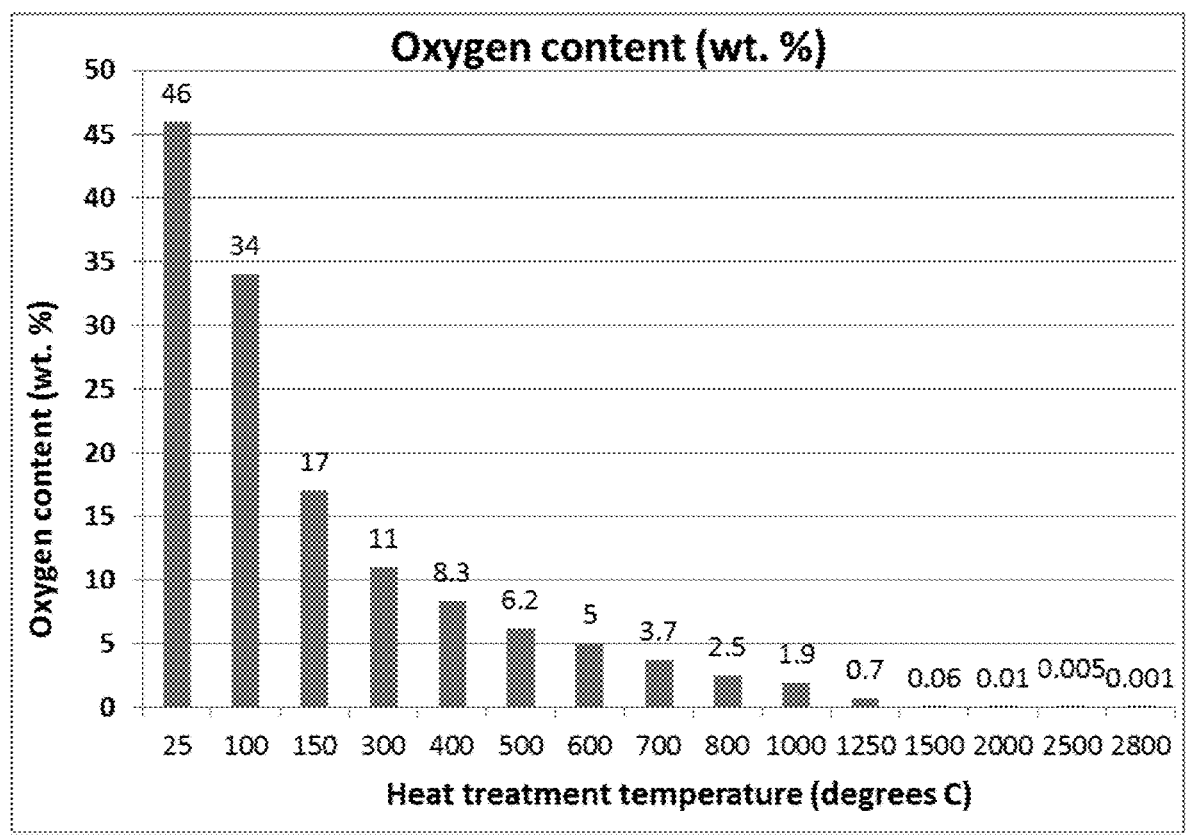
FIG. 8(B) the oxygen content in the GO suspension-derived graphene foam.

The inter-graphene spacing values of both the GO suspension-derived samples obtained by heat treating at various temperatures over a wide temperature range are summarized in FIG. 8(A). Corresponding oxygen content values in the GO suspension-derived unitary graphene layer are shown in FIG. 8(B).

It is of significance to point out that a heat treatment temperature as low as 500° C. is sufficient to bring the average inter-graphene spacing in GO sheets along the pore walls to below 0.4 nm, getting closer and closer to that of natural graphite or that of a graphite single crystal. The beauty of this approach is the notion that this GO suspension strategy has enabled us to re-organize, re-orient, and chemically merge the planar graphene oxide molecules from originally different graphite particles or graphene sheets into a unified structure with all the graphene planes now being larger in lateral dimensions (significantly larger than the length and width of the graphene planes in the original graphite particles). A potential chemical linking mechanism is illustrated in FIG. 3. This has given rise to exceptional thermal conductivity and electrical conductivity values.

In conclusion, we have successfully developed an absolutely new, novel, unexpected, and patently distinct class of highly conducting, elastic, thermally stable, and strong sealing materials. The sealing material (e.g. an O-ring) comprises a graphene foam as a framework or skeleton to accommodate a permeation-resistant material (rubber, plastic, metal, carbon, pitch, glass, ceramic, etc.). Also developed are related processes for producing this class of sealing materials. The thermal conductivity, electrical conductivity, thermal stability, compressive elastic deformation, and compressive strength exhibited by the presently invented graphene foam-based sealing materials are much higher than those of prior art sealing materials.

We claim:

1. A process for producing a graphene foam-based sealing material from graphene sheets, said process comprising:
(a) preparing a graphene dispersion having multiple sheets of a graphene material dispersed in a liquid medium, wherein said graphene material is selected from the group consisting of pristine graphene, graphene oxide, reduced graphene oxide, graphene fluoride, graphene chloride, graphene bromide, graphene iodide, hydrogenated graphene, nitrogenated graphene, chemically functionalized graphene, and combinations thereof, having a non-carbon element content of substantially 0% to 50% by weight, and wherein said dispersion contains a blowing agent having a blowing agent-to-graphene material weight ratio from 0/1.0 to 1.0/1.0;
(b) dispensing and depositing said graphene dispersion to form one or a plurality of elongated shapes and partially or completely removing said liquid medium from said shapes to form one or a plurality of dried elongated graphene shapes;
(c) heat treating the one or a plurality of dried elongated graphene shapes at a first heat treatment temperature from 50° C. to 3,200° C. at a desired heating rate sufficient to induce volatile gas molecules from said non-carbon elements or to activate said blowing agent for producing one or a plurality of solid graphene foam shapes having a density from 0.01 to 1.7 g/cm$^3$ or a specific surface area from 50 to 2,600 m$^2$/g; and
(d) coating or impregnating said one or a plurality of solid graphene foam shapes with a binder or matrix material to form one or a plurality of said sealing materials, wherein said binder or matrix material comprises a polymer material, wherein said polymer is selected from the group consisting of thermoplastic resin, thermoset resin, rubber, thermoplastic elastomer, simultaneous penetrating network, and combinations thereof, wherein said rubber or thermoplastic elastomer is selected from the group consisting of butadiene rubber (BR), butyl rubber (IIR), chlorosulfonated polyethylene (CSM), epichlorohydrin rubber (ECH, ECO), ethylene propylene diene monomer (EPDM), ethylene propylene rubber (EPR), fluoroelastomer (FKM), nitrile rubber (NBR, HNBR, HSN, Buna-N), perfluoroelastomer (FFKM), polyacrylate rubber(ACM), polychloroprene (neoprene) (CR), polyisoprene (IR), polysulfide rubber (PSR), polytetrafluoroethylene (PTFE), sanifluor (FEPM), styrene-butadiene rubber (SBR), thermoplastic elastomer (TPE) styrenics, thermoplastic polyolefin (TPO), thermoplastic polyurethane (TPU), thermoplastic ether ester elastomers (TEEEs) copolyester, thermoplastic polyamide (PEBA), melt processible rubber (MPR), thermoplastic vulcanizate (TPV), and combinations thereof.

2. The process of claim 1, further including a step of heat-treating the solid graphene foam at a second heat treatment temperature higher than said first heat treatment temperature for a length of time sufficient for obtaining a graphene foam wherein said pore walls contain stacked graphene planes having an inter-plane spacing $d_{002}$ from 0.3354 nm to 0.36 nm and a content of non-carbon elements less than 2% by weight.

3. The process of claim 2, wherein said first or second heat treatment temperature includes at least a temperature selected from (A) 300-1,500° C., (B) 1,500-2,100° C., and/or (C) 2,100-3,200° C.

4. The process of claim 1, wherein said dispersion contains a blowing agent having a blowing agent-to-graphene weight ratio from 0.01/1.0 to 1.0/1.0.

5. The process of claim 1, wherein said binder or matrix material occupies from 10% to 98% of a pore volume of said solid graphene foam shapes.

6. The process of claim 5, wherein said binder or matrix material occupies only an outer portion of a solid graphene foam shape, leaving behind a core portion free from said binder or matrix material.

7. The process of claim 1, wherein said graphene-based sealing material is an O-ring.

8. The process of claim 1, wherein said non-carbon elements include an element selected from oxygen, fluorine, chlorine, bromine, iodine, nitrogen, hydrogen, or boron.

9. The process of claim 1, wherein said graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, and combinations thereof, and wherein said first heat treatment temperature is less than 2,500° C. and said solid graphene foam contains a content of non-carbon elements in the range of 0.01% to 2.0% by weight.

10. The process of claim 1, wherein said liquid medium consists of water, an alcohol, an organic solvent, or a combination thereof.

11. The process of claim 1, which is a roll-to-roll process wherein said steps (b) and (c) include feeding said supporting substrate from a feeder roller to a deposition zone, continuously or intermittently depositing said graphene dispersion onto a surface of said supporting substrate to form said wet layer of graphene material thereon, drying said wet layer of graphene material to form the dried layer of graphene material, and collecting said dried layer of graphene material deposited on said supporting substrate on a collector roller.

12. The process of claim 1, wherein said sheet of solid graphene foam has a density from 0.1 to 1.5 g/cm$^3$.

13. The process of claim 1, wherein said graphene foam has an oxygen content or non-carbon content less than 0.01%, pore walls having an inter-graphene spacing less than 0.34 nm, a thermal conductivity from 150 W/mK to 500 W/mK per unit of specific gravity, and/or an electrical conductivity from 2,000 S/cm to 4,000 S/cm per unit of specific gravity.

14. The process of claim 1, wherein the pore walls comprises stacked graphene planes having an inter-graphene spacing less than 0.337 nm and a mosaic spread value less than 1.0 or wherein the solid graphene foam exhibits a degree of graphitization no less than 80% and/or a mosaic spread value less than 0.4.

15. The process of claim 1, wherein pore walls of said solid graphene foam contain a 3D network of interconnected graphene planes.

16. The process of claim 1, wherein said solid graphene foam comprises mesoscaled pores having a pore size from 2 nm to 50 nm.

\* \* \* \* \*